US010661496B2

(12) United States Patent
Das et al.

(10) Patent No.: US 10,661,496 B2
(45) Date of Patent: May 26, 2020

(54) PROCESS FOR SURFACE MODIFICATION OF MATERIALS

(71) Applicant: Conopco, Inc., Englewood Cliffs, NJ (US)

(72) Inventors: Somnath Das, Whitefield (IN); Girish Muralidharan, Liverpool (GB); Amitava Pramanik, Liverpool (GB)

(73) Assignee: CONOPCO, INC., Englewood Cliffs, NJ (US)

( * ) Notice: Subject to any disclaimer, the term of this patent is extended or adjusted under 35 U.S.C. 154(b) by 161 days.

(21) Appl. No.: 15/553,350

(22) PCT Filed: Feb. 16, 2016

(86) PCT No.: PCT/EP2016/053262
§ 371 (c)(1),
(2) Date: Aug. 24, 2017

(87) PCT Pub. No.: WO2016/142131
PCT Pub. Date: Sep. 15, 2016

(65) Prior Publication Data
US 2018/0117828 A1 May 3, 2018

(30) Foreign Application Priority Data
Mar. 9, 2015 (EP) .................................... 15158164

(51) Int. Cl.
| | | |
|---|---|---|
| *B29C 59/02* | (2006.01) | |
| *C09D 5/00* | (2006.01) | |
| *B44B 5/02* | (2006.01) | |
| *B05D 1/02* | (2006.01) | |
| *B05D 1/18* | (2006.01) | |
| *B05D 5/08* | (2006.01) | |
| *C08L 23/06* | (2006.01) | |
| *C08L 23/12* | (2006.01) | |
| *C08L 25/06* | (2006.01) | |
| *C11D 3/12* | (2006.01) | |
| *B05D 3/12* | (2006.01) | |
| *B05D 7/02* | (2006.01) | |
| *B05D 1/14* | (2006.01) | |

(52) U.S. Cl.
CPC .............. *B29C 59/022* (2013.01); *B05D 1/02* (2013.01); *B05D 1/18* (2013.01); *B05D 3/12* (2013.01); *B05D 5/08* (2013.01); *B05D 7/02* (2013.01); *B29C 59/02* (2013.01); *B44B 5/02* (2013.01); *B44B 5/026* (2013.01); *C08L 23/06* (2013.01); *C08L 23/12* (2013.01); *C08L 25/06* (2013.01); *C09D 5/00* (2013.01); *C11D 3/124* (2013.01); *B05D 1/14* (2013.01); *B05D 2201/02* (2013.01); *B05D 2425/01* (2013.01); *B05D 2601/22* (2013.01); *B29C 2059/023* (2013.01); *B29K 2995/0093* (2013.01); *C08L 2207/062* (2013.01); *C08L 2207/066* (2013.01)

(58) Field of Classification Search
CPC .................................................. B29C 59/022
See application file for complete search history.

(56) References Cited

U.S. PATENT DOCUMENTS

| | | | | |
|---|---|---|---|---|
| 4,673,631 A | * | 6/1987 | Fukumoto | .......... G03G 9/09783 430/108.24 |
| 5,327,825 A | * | 7/1994 | Parker | ..................... B23P 15/24 101/32 |
| 6,660,363 B1 | | 12/2003 | Barthlott | |
| 7,544,411 B2 | | 6/2009 | Baumann et al. | |
| 2001/0051273 A1 | | 12/2001 | Veerasamy | |
| 2003/0096083 A1 | | 5/2003 | Morgan et al. | |
| 2003/0134086 A1 | * | 7/2003 | Nun | ......................... B05D 5/02 428/143 |
| 2003/0234470 A1 | * | 12/2003 | Haan | ...................... B29C 33/06 264/293 |
| 2007/0231542 A1 | | 10/2007 | Deng et al. | |
| 2008/0245273 A1 | * | 10/2008 | Vyorkka | ................. C04B 26/02 106/665 |

(Continued)

FOREIGN PATENT DOCUMENTS

| | | |
|---|---|---|
| DE | 10106213 | 8/2002 |
| EP | 1317967 | 6/2003 |

(Continued)

OTHER PUBLICATIONS

Machine Translation JPH11235762A (Year: 1999).*
Machine Translation JPH11235762 (Year: 1999).*
Machine Translation EP 1 317 967 (Year: 2001).*
Machine Translation JP2012017117 (Year: 2012).*
Machine Translation JP2013103719 (Year: 2013).*
IPRP in PCTEP2016053262, dated Feb. 9, 2017 (NPL 1, pp. 1-15).

(Continued)

*Primary Examiner* — Matthew J Daniels
*Assistant Examiner* — Wayne K. Swier
(74) *Attorney, Agent, or Firm* — Foley & Lardner LLP

(57) ABSTRACT

The present invention relates to surface modification of materials. In particular the invention relates to a process for surface modification of polymeric materials to make the surface non-stick in order to reduce the ability of materials to stick on it and thus provide an easy flow. The process comprises embossing the surface of an object with a pattern comprising micropillars having different shapes (circle, square, rectangular, polygonal prismatic) with an equivalent circular diameter, height and pitch in the range 10-200 microns; applying a layer of adhesive to get a coverage of 0.1 to 5 mg/cm on the embossed surface either by spray coating or dip coating; depositing 0.2 to 1.2 mg/cm of hydrophobic particles wherein the hydrophobic particles have a particle size in the range 0.1 to 10 microns.

18 Claims, No Drawings

(56) References Cited

U.S. PATENT DOCUMENTS

| | | | | |
|---|---|---|---|---|
| 2009/0298369 | A1* | 12/2009 | Koene | B05D 5/08 |
| | | | | 442/79 |
| 2010/0028604 | A1* | 2/2010 | Bhushan | B05D 1/60 |
| | | | | 428/156 |
| 2010/0243159 | A1* | 9/2010 | Nishio | B29C 53/32 |
| | | | | 156/712 |
| 2010/0294015 | A1 | 11/2010 | Fahrenbach | |
| 2011/0069361 | A1* | 3/2011 | Jun | B29C 45/372 |
| | | | | 359/2 |
| 2012/0107581 | A1 | 5/2012 | Simpson et al. | |
| 2012/0118886 | A1* | 5/2012 | Sekiguchi | B65D 43/02 |
| | | | | 220/200 |
| 2013/0251948 | A1* | 9/2013 | Lyons | B32B 5/16 |
| | | | | 428/148 |
| 2014/0147631 | A1* | 5/2014 | Yang | B05D 5/08 |
| | | | | 428/143 |
| 2014/0314975 | A1* | 10/2014 | Smith | B05C 7/00 |
| | | | | 428/34.1 |
| 2014/0314991 | A1* | 10/2014 | Smith | A47J 36/025 |
| | | | | 428/141 |
| 2014/0318657 | A1 | 10/2014 | Bixler et al. | |
| 2015/0175317 | A1 | 6/2015 | Imai et al. | |

FOREIGN PATENT DOCUMENTS

| | | | | |
|---|---|---|---|---|
| EP | 1317967 | A2 * | 6/2003 | |
| EP | 2397319 | | 12/2011 | |
| EP | 2397319 | A1 * | 12/2011 | |
| JP | 11235762 | A * | 8/1999 | |
| JP | H11235762 | A * | 8/1999 | B29C 65/48 |
| JP | 2005350502 | | 12/2005 | |
| JP | 2012017117 | | 1/2012 | |
| JP | 2012017117 | A * | 1/2012 | |
| JP | 2013103719 | A * | 5/2013 | |
| JP | 2013103719 | | 5/2016 | |
| WO | WO2009028745 | | 3/2009 | |
| WO | WO2012083011 | | 6/2012 | |
| WO | WO2012118805 | | 9/2012 | |
| WO | WO2012138992 | | 10/2012 | |
| WO | WO2013184210 | | 12/2013 | |
| WO | WO2014038701 | | 3/2014 | |
| WO | WO2014108892 | | 7/2014 | |
| WO | WO2014145414 | | 9/2014 | |
| WO | WO2014145586 | | 9/2014 | |

OTHER PUBLICATIONS

Search Report and Written Opinion in PCTEP2016053262, dated May 19, 2016 (NPL 1, pp. 16-29).

Search Report and Written Opinion in EP15158164, dated Jul. 9, 2015 (NPL 1, pp. 30-34).

Ebert, D. and Bhushan, B.; Wear-resistant rose petal-effect surfaces with superhydrophobicity and high droplet adhesion using hydrophobic and hydrophilic nanoparticles; J. Coll. Interface Sci; 2012; pp. 182-188; vol. 384.

Milionis, A., et al.; Spatially controlled surface energy traps on superhydrophobic surfaces; ACS Applied Materials and Interfaces; 2014; pp. 1026-1043; vol. 6.

Lebo Xu, et al.; ACS Applied Materials and Interfaces; Transparent, superhydrophobic surfaces from one-step spin coating of hydrophobic nanoparticles. ACS Applied Materials and Interfaces; 2012; pp. 1118-1125; 4.

Su, B., et al.; "Clinging-microdroplet" patterning upon high-adhesion, pillar-structured silicon substrates; Advanced Functional Materials; 2011; pp. 3297-3307; 21.

Paul Roach, et al.; Progess in superhydrophobic surface development; Soft Matter; 2008; pp. 224-240; 4.

\* cited by examiner

PROCESS FOR SURFACE MODIFICATION OF MATERIALS

FIELD OF THE INVENTION

The present invention relates to surface modification of materials. In particular the invention relates to a process for surface modification of deformable materials such as polymeric materials to make the surface non-sticking in order to reduce the ability of materials such as viscous food or personal care and hygiene compositions to stick on it and thus provide an easy flow.

BACKGROUND OF THE INVENTION

Non-stick surface involves substrate modification and/or treatment so as to reduce the ability of materials to stick on it. Various compositions that generally have high viscosity like food preparations e.g tomato ketchup to personal care preparations like shampoo, liquid soap, moisturizing lotions etc., are packaged in containers. The material wastage due to sticking of materials or contents in a container to its walls is enormous.

One of the most commonly employed and commercially practiced approach for fabricating non-stick surfaces is the use of polytetrafluoroethylene (PTFE or Teflon) coating. However, this process is expensive and poses both environmental and health concerns.

U.S. 20110069361 (Jun Hyun-Woo et al.) discloses different ways to create pattern or imprint through either etching or injection moulding or hot embossing for making superhydrophobic surface. This has limited application as the contact angle obtained would not be very high since the process will form only micropillars, consequently the hydrophobicity imparted by such treatment would be lower.

Use of hydrophobic particles of one or more sizes and their combinations have been disclosed in WO12138992 (Trustees of Univ. of Pennsylvania), to create transparent hydrophobic surfaces. Use of combination of particles with different particles sizes results in enhanced roughness, which in turn enhances the hydrophobic properties.

However, these particles do not strongly bind to the surfaces, hence they cannot withstand damage to the surface, and subsequently the water repellence property is lost.

To circumvent this problem, use of binders (U.S. 2012107581, US Dept. of Energy) or coupling agents (WO14038701, Toppan Printing Co. Ltd) have been proposed. U.S. 2012107581 discloses a composition for producing an optically clear, well bonded superhydrophobic coating which includes hydrophobic particles, a binder and a solvent. They use ethyl cyanoacrylate, polyacrylic acid, polytetrafluoroethylene, polyurethane as the binder. In such cases, low concentrations of binders are typically mixed with the particles and multiple dip cycles are required to achieve superhydrophobicity. Alternatively, use of coupling agents has been disclosed in WO14038701 but they do not generate micropillars and the process employed is different.

U.S. 2001/0051273 A1 (Veerasamy) discloses a substrate coated with a hydrophobic layer(s) that includes e.g., highly tetrahedral amorphous carbon that is a form of diamond-like carbon (DLC), or any other suitable material. The exterior surface of the resulting coated article exhibits a surface roughness sufficient so that the article has an initial contact angle of at least about 100 degrees. In certain embodiments, the layer has a surface energy of no more than about 20.2 mN/m and/or an average hardness of at least about 10 GPa.

The problem with the above mentioned methods for making surfaces hydrophobic is that either the surfaces cannot withstand damage even by mild abrasion and subsequently the water repellence property is lost or the resulting contact angle is relatively low. This is mainly due to dislodging of the hydrophobic particles from the surface. The present inventors have been able to select adhesives that allow strong adherence of particles to the surface to provide good and stable hydrophobic properties. It is a challenge to obtain stable super hydrophobic surfaces and the present inventors have been able to achieve this by a specific process and by a combination of creating micropillars along with the use of specific adhesives and hydrophobic particles.

It is an object of the present invention to provide a process to modify the surface of an object to make the surface non-sticking and thus provide an easy flow for viscous materials.

It is another object of the present invention to provide a process to modify the surface of an object to provide super hydrophobic surfaces by creating micropillars and depositing hydrophobic particles using an adhesive layer.

It is another object of the present invention to provide a process to modify the surface of an object to make the surface hydrophobic and to retain this property even when the surface is subjected to damage by mild abrasion.

SUMMARY OF THE INVENTION

According to the present invention there is provided a process for surface modification of materials comprising:
(i) embossing the surface of an object with an embosser comprising micropillars with an equivalent circular diameter, height and pitch each in the range 10-200 microns;
(ii) applying 0.1 to 5 mg/cm$^2$ of adhesive on the embossed surface resulting from step (i);
(iii) depositing 0.2 to 1.2 mg/cm$^2$ of hydrophobic particles resulting from step (ii);
wherein the hydrophobic particles have a particle size with d50 in the range 0.1 to 10 microns.

DETAILED DESCRIPTION OF THE INVENTION

The present invention relates to a process for surface modification of materials comprising:
(i) embossing the surface of an object with an embosser comprising micropillars with an equivalent circular diameter, height and pitch each in the range 10-200 microns;
(ii) applying 0.1 to 5 mg/cm$^2$ of adhesive on the embossed surface resulting from step (i);
(iii) depositing 0.2 to 1.2 mg/cm$^2$ of hydrophobic particles on the surface resulting from step (ii);
wherein the hydrophobic particles have a particle size with d50 in the range 0.1 to 10 microns.

The surface modification of the materials by the process according to the invention make the surface of materials hydrophobic and preferably enable them to retain this property even when the surface is subjected to damage by mild abrasion which preferably is rubbing the surface with a plastic cleaning mop operated under a load of 5 kg for 2 minutes.

Embossing:

The object selected for the modification of the surface is preferably any deformable material and more preferably polymeric materials as these are generally employed for packaging of viscous food or personal care and hygiene compositions. The polymeric materials are preferably selected from high density polyethylene (HDPE), low density polyethylene (LDPE), polyethylene terephthalate (PET), polypropylene (PP) or polystyrene (PS) or their derivatives.

The embossing of the surface of an object to create a pattern on their surface is done by using preferably an embosser which is a metal mesh and more preferably a stainless steel mesh having different shapes which may preferably be circle, square, rectangular or polygonal prismatic with an equivalent circular diameter, height and pitch each in the range 10-200 microns and preferably 30-100 microns. Equivalent circular diameter refers to the diameter of a circle with area equal to that of the 2 dimensional projections of other shapes. The embossing of the surface of an object is suitably achieved either through hot pressing or soft-lithography techniques at a temperature which may range from ambient room temperature to high temperature. It is preferred to use hot pressing for embossing the surface of the object. In the hot embossing process, the mesh is preferably heated to a temperature of 70° C. to 120° C. and more preferably 80° C. to 100° C. and preferably pressed on the surface of the object. The object is preferably cooled after removing the metal mesh.

Application of the Adhesive:

The adhesive is preferably selected from those that have a shear elastic modulus <0.3 MPa at frequencies 1 Hz and more preferably 0.1 to 0.2 MPa at frequencies ~1 Hz. The shear elastic modulus of the adhesive is preferably as per Dahlquist Criterion. The adhesive is applied on to the embossed surface of the object by preferably spray or dip coating. The adhesive is preferably comprises acrylics, styrene block copolymers, natural rubber and silicone formulations, having shear elastic modulus <0.3 MPa at frequencies ~1 Hz.

The application of the adhesive is to provide 0.1 to 5 mg/cm$^2$ of adhesive on the embossed surface and more preferably 0.3 to 2 mg/cm$^2$.

Hydrophobic Particles:

The hydrophobic particles are deposited over the adhesive layer and are preferably selected from water insoluble inorganic materials such as metal or non-metal oxides selected from silica, titania, alumina, zinc oxide, magnesium oxide or hydroxide; metal carbonates selected from calcium carbonate, magnesium carbonate, zinc carbonate; metal phosphates selected from calcium phosphate, magnesium phosphate; natural or synthetic silicates selected from clays, zeolites, talc, calcium silicate, magnesium silicate; or cross-linked polymers selected from polystyrene, polyethylene, polyvinyl acrylates. The hydrophobic particles are preferably selected from water insoluble inorganic materials that have a particle size with d50 in the range 0.1 to 10 microns, preferably 0.2 to 8 microns and more preferably 0.2 to 1 micron. The d50 for the hydrophobic particles is preferably determined by standard light scattering experiments. The hydrophobic particles are preferably a mixture of two different sizes of particles and more preferably the smaller particles are in the range 2-8 times smaller than the larger particles. It is preferable that the d50 of the smaller hydrophobic particles is in the range 0.2 to 2 microns and more preferably 0.2 to 0.5 micron and the d50 of the larger hydrophobic particles is in the range 0.8 to 8 microns and more preferably 0.8 to 1 micron.

The hydrophobic particles are preferably deposited to provide 0.2 to 1.2 mg/cm$^2$ of hydrophobic particles on the surface and more preferably 0.25 to 0.5 mg/cm$^2$ on the surface. The hydrophobic particles can be deposited on the surface of the deformable material through various routes such as spray coating, dip coating, spin coating and mixing in the raw material feed during plastic making and more preferably deposited on the surface of the deformable material by applying a solvent with a vapour pressure greater than 50 mm Hg at 25° C. comprising the particles. The solvent is preferably selected from methanol, ethanol, isopropanol, hexane, chloroform, benzene, xylene or toluene. The hydrophobic particles are insoluble in water and also in solvents with a vapour pressure greater than 50 mm Hg at 25° C.

Hydrophobically Modified Object:

An object with an embossed surface prepared according to the process of the present invention is preferably a deformable material and more preferably a polymeric material. The polymeric materials are preferably selected from high density polyethylene (HDPE), low density polyethylene (LDPE), polyethylene terephthalate (PET), polypropylene (PP) or polystyrene (PS) or their derivatives.

The embossed surface of the object comprise of micropillars having different shapes which may preferably be circle, square, rectangular or polygonal prismatic with an equivalent circular diameter, height and pitch each in the range 10-200 microns and preferably 30-100 microns, with the hydrophobic particles adhering on the micropillars by an adhesive layer.

The embossed surface of the object prepared according to the present invention will preferably have a water contact angle greater than 120° and the surfaces will also show a liquid roll off at tilt angles of ≤10°, for liquids having viscosities above 100 cP and also preferably enable them to retain this property even when the surface is subjected to damage by mild abrasion which preferably is rubbing the surface with a plastic cleaning mop operated under a load of 5 kg for 2 minutes.

The contact angle is measured by placing a 10 µL droplet of water and holding the test samples horizontally and capturing the images for contact angle determination. The contact angle was estimated using ImageJ© software through the help of DropSnake plug-in.

Viscous liquid roll off is determined by placing 50 µL droplet of a viscous liquid on the test sample and then tilting it at 10° inclination to see whether the liquid rolls off or not.

EXAMPLES (1) Preparation of Hydrophobically Surface Modified Materials (a) Method of Embossing the Surface:

A deformable material, high density polyethylene (HDPE) of size 2 cm×2 cm was embossed using stainless steel mesh of 80 µm pitch at 90° C. by pressing the stainless steel mesh on the deformable material for 1 minute. The material was cooled after removing the stainless steel mesh to obtain the embossed deformable material.

(b) Method of Applying the Adhesive:

Two types of adhesives were used based on the shear elastic modulus of the adhesive. Adhesive 1 had a shear elastic modulus greater than 0.3 MPa while adhesive 2 had a shear elastic modulus below 0.3 MPa at frequencies ~1 Hz. The adhesives were separately spray coated on two embossed materials to get a coverage of 1.5 mg/cm$^2$. In the current study, commercially available Fevikwik® [ex-Pidilite Industries Ltd, India], which is based on cyanoacrylate, was used as adhesive 1 while repositionable 75 Spray Adhesive® [ex-3M] was used as adhesive 2. For comparison purposes, a set comprising the embossed material without any adhesive was also studied.

(c) Method of Depositing the Hydrophobic Particles:

(i) Hydrophobic particles were deposited on the surface of the embossed deformable material after spraying of the adhesives mentioned above.

(ii) Control sample as mentioned in the prior art process where the adhesive and the hydrophobic particles were mixed together and applied on the surface of the embossed deformable material.

(iii) Another set of control sample was where the hydrophobic particles were deposited on the surface of the embossed deformable material which was not spray coated with the adhesive.

0.16 ml of 1% hydrophobic silica particles [Sipernat d10 ex-Evonik Corp] dispersed in chloroform was sprayed on the surface of the embossed deformable material to obtain 0.40 mg of silica per $cm^2$ of the embossed deformable material and dried at room temperature for 30 minutes. In the set where the hydrophobic silica was mixed with the adhesives and sprayed, the amount of hydrophobic silica on the embossed surface was maintained at 0.40 mg of silica per $cm^2$ of the embossed deformable material.

The various materials prepared by the above process are defined as Examples in Table 1.

TABLE 1

Surface modification of deformable materials

| Example | Embossing | Hydrophobic particle | Adhesive | Adhesive type | Spraying of particle and adhesive |
|---|---|---|---|---|---|
| 1 | Yes | No | No | — | — |
| 2 | Yes | Yes | No | — | — |
| 3 | Yes | Yes | Yes | 1 | Sequential |
| 4 | Yes | Yes | Yes | 2 | Sequential |
| 5 | Yes | Yes | Yes | 1 | Simultaneous |
| 6 | Yes | Yes | Yes | 2 | Simultaneous |

2. Quantification of Superhydrophobicity and Viscous Liquid Roll Off and the Stability of the Hydrophobic Particle Binding:

The contact angle was measured for samples as in Table 1 by placing a 10 μL droplet of water and holding the samples horizontally and capturing the images for contact angle determination. The contact angle was estimated using ImageJ© software through the help of DropSnake plug-in.

Typically, viscous liquids are those which have viscosities above 100 cP. In this study, viscous liquid roll off was tested using a model liquid which contains 0.5% xanthum gum aqueous solution, which is equivalent to the amount typically used in products such as ketchup. The viscosity of 0.5% aqueous xanthum gum solution is found to be 600 cP at a shear rate of 3 $s^{-1}$. 50 μL droplet of viscous liquid was placed on the surfaces as mentioned in Table 1 horizontally and then tilted at 10° inclination to see whether the liquid rolls off or not.

The contact angle and viscous liquid roll off was measured for the materials prepared as per Examples 1-6. The measurements were again repeated after subjecting the embossed and particle-coated surface to rubbing with a plastic cleaning mop operated under a load of 5 kg for 2 minutes in order to check the stability of such coatings after treatments equivalent to washing or cleaning of such surfaces.

The data are presented in Table 2.

TABLE 2

Effect of nature of adhesive on particle binding and superhydrophobicity

| | Before rubbing | | After rubbing | |
|---|---|---|---|---|
| Example | Contact angle (°) | Viscous liquid roll off | Contact angle (°) | Viscous liquid roll off |
| Example 1 | 90 | No | 90 | No |
| Example 2 | 150 | Yes | 103 | No |
| Example 3 | <60 | No | <60 | No |
| Example 4 | 150 | Yes | 146 | Yes |
| Example 5 | <60 | No | <60 | No |
| Example 6 | 83 | No | <60 | No |

Data presented in Table 2 show that for the embossed deformable material sprayed with hydrophobic particles, the contact angle increases from 90° to 150° (Example 2). However, in the absence of adhesive, the particle binding is not stable, thereby resulting in lowering of the contact angle to 103° when the surface of the material is subjected to rubbing as described above (Example 2).

Materials prepared according to the invention, i.e., by using adhesive 2, had a good hydrophobic surface with a high contact angle and even after rubbing they retained hydrophobicity as observed from the contact angle of 146° (Example 4) while similar study using adhesive 1 did not result in a good hydrophobic surface and on rubbing of the surface, further lowering of contact angle to below 60° was observed (Example 3). It was also observed that sequential application of the hydrophobic particles after the spray coating of the adhesive 2 (shear elastic modulus <0.3 MPa) was significantly superior compared to the prior art process where the hydrophobic particles were deposited along with the spray coated adhesive on the embossed surface. This effect was observed before and after subjected to rubbing of the surface.

It was observed that the good viscous roll off property was seen and this effect was maintained even after rubbing of the surface only when the hydrophobic surface was prepared according to the invention.

3. Effect of Extent of Deposition of Hydrophobic Particles on Roll Off of Viscous Liquid A deformable material, high density polyethylene (HDPE) of size 2 cm×2 cm was embossed and spray coated with adhesive 2 to obtain a coverage of 1.5 mg/$cm^2$ as described above. Various levels of the hydrophobic silica as shown in Table 3 was deposited after the spray coating of the adhesive in a sequential manner as per the invention. Contact angle was measured with and without rubbing of the hydrophobic surface as per procedure described above.

TABLE 3

Effect of levels of particle deposition on water contact angle

| Example | Particle (mg/$cm^2$) | Contact angle (before rubbing) | Contact angle (after rubbing) |
|---|---|---|---|
| Example 1 | 0 | 90 | 90 |
| Example 7 | 0.18 | 122 | 111 |
| Example 8 | 0.25 | 136 | 121 |
| Example 4 | 0.40 | 150 | 146 |
| Example 9 | 0.57 | 136 | 129 |
| Example 10 | 1.55 | 129 | 116 |

The data show that deposition of hydrophobic silica in the range according to the invention 0.2 to 1.2 mg/cm² has good contact angle before and after rubbing of the surface but when the level of deposition is beyond this range, the contact angle drops significantly resulting in poor hydrophobicity.

The invention claimed is:

1. A process for surface modification of materials comprising:
   (i) embossing the surface of an object with an embosser comprising micropillars with an equivalent circular diameter, height and pitch each in the range of 10-200 microns;
   (ii) applying 0.1 to 5 mg/cm² of adhesive on the embossed surface resulting from step (i), wherein the adhesive has a shear elastic modulus <0.3 MPa at a frequency of 1 Hz;
   (iii) depositing 0.2 to 1.2 mg/cm² of hydrophobic particles on the surface resulting from step (ii);
   wherein the hydrophobic particles have a particle size with d50 in the range 0.1 to 10 microns.

2. The process for surface modification of materials as claimed in claim 1, wherein the adhesive has a shear elastic modulus 0.1 to <0.3 MPa at a frequency of 1 Hz.

3. The process surface modification of materials as claimed in claim 1, wherein the application of the adhesive is by spray coating or dip coating.

4. The process for surface modification of materials as claimed in claim 1, wherein the hydrophobic particles are a mixture of two different sizes of particles wherein the smaller particles are in the range of 2-8 times smaller than the larger particles.

5. The process for surface modification of materials as claimed in claim 1, wherein the d50 of the smaller hydrophobic particles is in the range 0.2 to 2 microns and the d50 of the larger hydrophobic particles is in the range 0.8 to 8 microns.

6. The process for surface modification of materials as claimed in claim 1, wherein the d50 of the smaller hydrophobic particles is in the range 0.2 to 0.5 microns and the d50 of the larger hydrophobic particles is in the range 0.8 to 1 microns.

7. The process for surface modification of materials as claimed in claim 1, wherein the hydrophobic particles are selected from water insoluble inorganic materials or crosslinked polymers.

8. The process for surface modification of materials as claimed in claim 1, wherein the hydrophobic particles are deposited by applying a solvent with a vapour pressure greater than 50 mm Hg at 25° C. comprising the particles.

9. The process for surface modification of materials as claimed in claim 8, wherein solvent is selected from methanol, ethanol, isopropanol, hexane, chloroform, benzene, xylene or toluene.

10. An object comprising:
    an embossed surface obtainable by the process as claimed in claim 1, wherein the embossed surface comprises:
       micropillars with an equivalent circular diameter, height and pitch each in the range of 10-200 microns;
    wherein:
       the micropillars are surface coated with 0.1 to 5 mg/cm² of an adhesive and 0.2 to 1.2 mg/cm² of hydrophobic particles, and the adhesive has a shear elastic modulus <0.3 MPa at a frequency of 1 Hz; and
       the hydrophobic particles have a particle size with d50 in the range 0.1 to 10 microns.

11. The object as claimed in claim 10, comprising a hydrophobically modified embossed surface.

12. The object as claimed in claim 10, wherein the object is a polymeric material selected from high density polyethylene (HDPE), low density polyethylene (LDPE), polyethylene terephthalate (PET), polypropylene (PP) or polystyrene (PS) or their derivatives.

13. The object as claimed in claim 10, wherein the hydrophobically modified surface has a water contact angle greater than 120° and a liquid roll off at tilt angles of ≤10°, for liquids having viscosities above 100 cP.

14. The process for surface modification of materials as claimed in claim 1, wherein the embosser comprises a metal mesh.

15. The process for surface modification of materials as claimed in claim 1, wherein the embossing employs a hot pressing technique carried out at a temperature from 70° C. to 120° C.

16. The process for surface modification of materials as claimed in claim 7, wherein the hydrophobic particles are selected from metal or non-metal oxides, metal carbonates, metal phosphates, natural silicates, synthetic silicates, or a crosslinked polymer selected from polystyrene, polyethylene, or polyvinyl acrylate.

17. The process of claim 16, wherein
    the object is a polymeric material selected from high density polyethylene (HDPE), low density polyethylene (LDPE), polyethylene terephthalate (PET), polypropylene (PP) or polystyrene (PS); and
    the application of the adhesive is by spray coating or dip coating.

18. The process of claim 17 wherein the hydrophobic particles are silica particles.

* * * * *